(12) United States Patent
Mandaleeka

(10) Patent No.: US 11,343,151 B2
(45) Date of Patent: May 24, 2022

(54) AUTOMATIC NETWORK SCALING FOR DATA CENTERS

(71) Applicant: HEWLETT PACKARD ENTERPRISE DEVELOPMENT LP, Houston, TX (US)

(72) Inventor: Venkata Sathyaphani Mandaleeka, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 296 days.

(21) Appl. No.: 16/529,421

(22) Filed: Aug. 1, 2019

(65) Prior Publication Data
US 2021/0036923 A1    Feb. 4, 2021

(51) Int. Cl.
*H04L 41/08*         (2022.01)
*G06Q 10/06*         (2012.01)
*H04L 41/0668*       (2022.01)
*H04L 41/12*         (2022.01)

(52) U.S. Cl.
CPC ... *H04L 41/0886* (2013.01); *G06Q 10/06312* (2013.01); *H04L 41/0668* (2013.01); *H04L 41/12* (2013.01)

(58) Field of Classification Search
CPC .............................................. G06Q 10/06312
See application file for complete search history.

(56) References Cited

U.S. PATENT DOCUMENTS

| 8,572,612 | B2 | 10/2013 | Kern |
| 9,547,534 | B2 | 1/2017 | Dettori et al. |
| 2013/0311632 | A1 | 11/2013 | Chang et al. |
| 2015/0277951 | A1 | 10/2015 | Sundararaman et al. |
| 2019/0230025 | A1* | 7/2019 | Kommula ........... H04L 41/0893 |

OTHER PUBLICATIONS

Kubernetes, "What is Kubernetes", available online at <https://web.archive.org/web/20190718151404/https://kubernetes.io/docs/concepts/overview/what-is-kubernetes/>, Jul. 18, 2019, 6 pages.
RF Wireless World, "Advantages of WDM | Disadvantages of WDM | Wavelength Division Multiplexing", RF & Wireless Vendors and Resources, available online at <https://www.rfwireless-world.com/Terminology/Advantages-and-Disadvantages-of-WDM.html>, 2012, 4 pages.
Techtarget , "Plexxi", available online at <https://searchnetworking.techtarget.com/definition/Plexxi>, 2000, 4 pages.

(Continued)

*Primary Examiner* — Brian Whipple
(74) *Attorney, Agent, or Firm* — Sheppard Mullin Richter & Hampton LLP

(57) ABSTRACT

Systems and methods are provided for automatic network scaling for data centers. One of the methods comprises storing respective configurations of a plurality of interconnectors, wherein each interconnector is in communication with a respective plurality of servers in a respective rack and a respective top-of-rack switch, and wherein each configuration describes connections between the respective servers and the respective top-of-rack switch, determining a traffic load of each interconnector, and transferring traffic between interconnectors having compatible configurations according to the traffic loads.

21 Claims, 6 Drawing Sheets

(56) References Cited

OTHER PUBLICATIONS

Auto Scaling the VM-series on AWS, (Research Paper), Retrieved Jun. 3, 2019, 2 Pgs, Palo Alto Networks.
Lorido-Botran, T. et al., A Review of Auto-scaling Techniques for Elastic Applications in Cloud Environments, (Research Paper), Journal of Grid Computing, Dec. 2014, pp. 559-592, vol. 12, No. 4.
Holland, G., Cloud Interconnect—Where Network and Cloud Meet, (Research Paper), Apr. 11, 2016, 7 Pgs.
What is Scalability in the Cloud?, (Web Page), Apr. 27, 2018, 5 Pgs, Stonefly.

* cited by examiner

AUTOMATIC NETWORK SCALING FOR DATA CENTERS

DESCRIPTION OF RELATED ART

The disclosed technology relates generally to data communication networks, and more particularly some embodiments relate to managing network devices in such networks.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
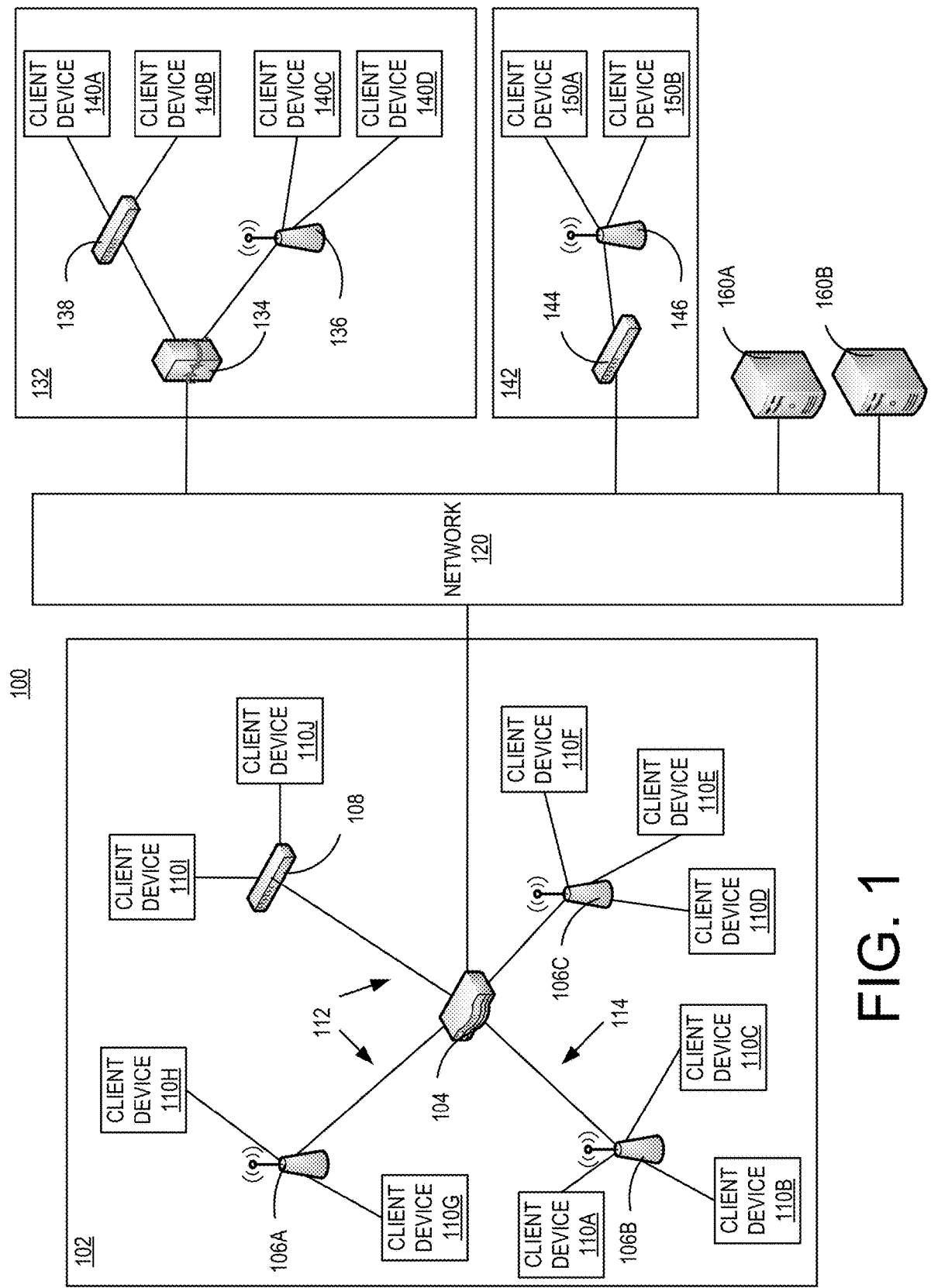
FIG. 1 illustrates one example of a network configuration.

The figures are not exhaustive and do not limit the present disclosure to the precise form disclosed.

DETAILED DESCRIPTION

The explosive growth of the Internet has driven the creation of vast data centers to serve Internet users. These data centers provide computing, storage, and communications infrastructure that allows customers to deploy large systems to serve Internet users, such as cloud computing systems. But the demand for these systems may vary greatly. For example, as a customer's business grows, so will his need for these data center resources. And the demand for data center resources may change yearly, seasonally, daily, and even from moment to moment.

In conventional cloud computing systems, it is quite difficult to scale these resources to accommodate changing demand. This difficulty is nowhere more evident than with communications and networking resources. Due to this difficulty in scaling, a cloud computing customer must predict his demand for cloud computing resources in advance, and plan his data center deployment carefully, considering dozens of factors such as power consumption, choice of networking gear, and the like. And with networking gear, the customer must accommodate changing traffic demand by adding and removing servers, reconfiguring the switches that connect the servers, allocating more or fewer communications ports, and the like. To accommodate these changes, the data center must increase its maintenance window, which is unacceptable in a cloud computing ecosystem.

Embodiments of the disclosed technology provide automatic network scaling for data centers. A data center provides a number of server racks. Each server rack accommodates a number of servers that provide computing and storage resources. Each rack also includes a top-of-rack switch to connect the servers in the rack to networks such as the Internet. Each rack may include an interconnector to provide configurable connectivity between the servers and the top-of-rack switch.

Embodiments of the disclosed technology provide an interconnector manager that communicates with the interconnectors. The interconnector manager may manage the interconnectors to provide automatic load-balancing, scaling, and the like. For example, when a server becomes overloaded, the interconnector manager may transfer a portion of that server's traffic to another server by managing the interconnector for that rack. As another example, when the servers in one rack become overloaded, the interconnector manager may transfer a portion of that rack's traffic to another rack by managing the interconnectors for those racks. In another example, when a customer adds a server to a rack, the interconnector manager may automatically detect the new server, and may automatically configure the rack's interconnector to connect the new server to the top-of-rack switch. Similarly, when a customer removes a server from a rack, the interconnector manager may automatically detect the removal, and may automatically configure the rack's interconnector accordingly. As another example, when an interconnector fails, the interconnector manager may automatically detect the failure, and may automatically transfer that interconnector's traffic to a backup interconnector.

To accommodate these operations, the interconnector manager may store a configuration of each interconnector. For example, when traffic is to be transferred away from a first interconnector, the interconnector manager may select a destination interconnector having the same configuration as the first interconnector, or may reconfigure an interconnector having a different configuration to have the same configuration as the first interconnector before transferring traffic to the reconfigured interconnector.

The disclosed interconnector managers may also reconfigure the interconnectors to accommodate changes in traffic volume. For example, when traffic volume changes for one of the servers in a rack, the interconnector manager may reconfigure the interconnector in that rack to increase or decrease the number of connections allocated to that server. On decreasing the number of connections for a server, the interconnector manager may reallocate those connections to other servers in the rack.

Before describing embodiments of the disclosed systems and methods in detail, it is useful to describe an example network installation with which these systems and methods might be implemented in various applications. FIG. 1 illustrates one example of a network configuration 100 that may be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120.

The primary site 102 may include a primary network (not shown), which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a controller 105 in communication with the network 120. The controller 105 may provide communication with the network 120 for the primary site 102, though it may not be the only point of communication with the network 120 for the primary site 102. A single controller 105 is illustrated, though the primary site may include multiple controllers and/or multiple communication points with network 120. In some embodiments, the controller 105 communicates with the network 120 through a router (not illustrated). In other embodiments, the controller 105 provides router functionality to the devices in the primary site 102.

A controller 105 may be operable to configure and manage network devices, such as at the primary site 102, and may also manage network devices at the remote sites 132, 142. The controller 105 may be operable to configure and/or manage switches, routers, access points, and/or client devices connected to a network. The controller 105 may itself be, or provide the functionality of, an access point.

The controller 105 may be in communication with one or more switches 108 and/or wireless Access Points (Aps) 106*a-c*. Switches 108 and wireless APs 106*a-c* provide network connectivity to various client devices 110*a-j*. Using a connection to a switch 108 or AP 106*a-c*, a client device 110*a-j* may access network resources, including other devices on the (primary site 102) network and the network 120.

Examples of client devices may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, and the like.

Within the primary site 102, a switch 108 is included as one example of a point of access to the network established in primary site 102 for wired client devices 110*i-j*. Client devices 110*i-j* may connect to the switch 108 and through the switch 108, may be able to access other devices within the network configuration 100. The client devices 110*i-j* may also be able to access the network 120, through the switch 108. The client devices 110*i-j* may communicate with the switch 108 over a wired 112 connection. In the illustrated example, the switch 108 communicates with the controller 105 over a wired 112 connection, though this connection may also be wireless.

Wireless APs 106*a-c* are included as another example of a point of access to the network established in primary site 102 for client devices 110*a-h*. Each of APs 106*a-c* may be a combination of hardware, software, and/or firmware that is configured to provide wireless network connectivity to wireless client devices 110*a-h*. In the illustrated example, APs 106*a-c* can be managed and configured by the controller 105. APs 106*a-c* communicate with the controller 105 and the network over connections 112, which may be either wired or wireless interfaces.

The network configuration 100 may include one or more remote sites 132. A remote site 132 may be located in a different physical or geographical location from the primary site 102. In some cases, the remote site 132 may be in the same geographical location, or possibly the same building, as the primary site 102, but lacks a direct connection to the network located within the primary site 102. Instead, remote site 132 may utilize a connection over a different network, e.g., network 120. A remote site 132 such as the one illustrated in FIG. 1 may be, for example, a satellite office, another floor or suite in a building, and so on. The remote site 132 may include a gateway device 134 for communicating with the network 120. A gateway device 134 may be a router, a digital-to-analog modem, a cable modem, a Digital Subscriber Line (DSL) modem, or some other network device configured to communicate to the network 120. The remote site 132 may also include a switch 138 and/or AP 136 in communication with the gateway device 134 over either wired or wireless connections. The switch 138 and AP 136 provide connectivity to the network for various client devices 140*a-d*.

In various embodiments, the remote site 132 may be in direct communication with primary site 102, such that client devices 140*a-d* at the remote site 132 access the network resources at the primary site 102 as if these clients devices 140*a-d* were located at the primary site 102. In such embodiments, the remote site 132 is managed by the controller 105 at the primary site 102, and the controller 105 provides the necessary connectivity, security, and accessibility that enable the remote site 132's communication with the primary site 102. Once connected to the primary site 102, the remote site 132 may function as a part of a private network provided by the primary site 102.

In various embodiments, the network configuration 100 may include one or more smaller remote sites 142, comprising only a gateway device 144 for communicating with the network 120 and a wireless AP 146, by which various client devices 150*a-b* access the network 120. Such a remote site 142 may represent, for example, an individual employee's home or a temporary remote office. The remote site 142 may also be in communication with the primary site 102, such that the client devices 150*a-b* at remote site 142 access network resources at the primary site 102 as if these client devices 150*a-b* were located at the primary site 102. The remote site 142 may be managed by the controller 105 at the primary site 102 to make this transparency possible. Once connected to the primary site 102, the remote site 142 may function as a part of a private network provided by the primary site 102.

The network 120 may be a public or private network, such as the Internet, or other communication network to allow connectivity among the various sites 102, 130 to 142 as well as access to servers 160*a-b*. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities. The network 120 may include various content servers 160*a-b*. Content servers 160*a-b* may include various providers of multimedia downloadable and/or streaming content, including audio, video, graphical, and/or text content, or any combination thereof. Examples of content servers 160*a-b* include, for example, web servers, streaming radio and video providers, and cable and satellite television providers. The client devices 110a-j, 140a-d, 150a-b may request and access the multimedia content provided by the content servers 160a-b.

Figure 2:
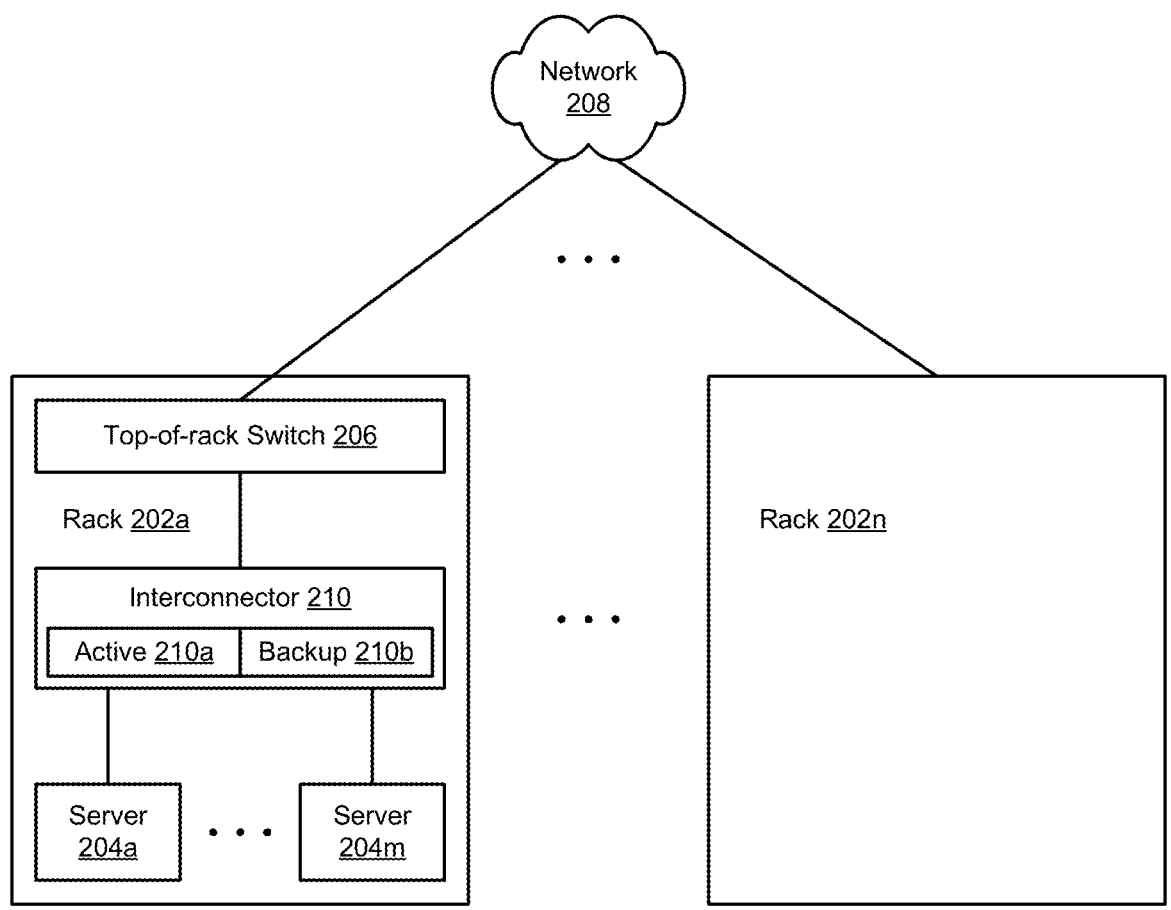
FIG. 2 is a block diagram that illustrates hardware components of a data center according to embodiments of the disclosed technology.

Having described an example network installation, embodiments of the disclosed technology will now be described. FIG. 2 is a block diagram that illustrates hardware components of a data center according to embodiments of the disclosed technology. Referring to FIG. 2, the data center includes a plurality of server racks 202a-n. FIG. 2 shows components of one of the racks 202a. Other racks 202 in the data center may have similar components. Each rack 202 includes a plurality of servers 204a-m, a top-of-rack switch 206 in communication with a network 208 such as the Internet, and an interconnector 210 that provides communication between the servers 204 and the top-of-rack switch 206. The interconnector 210 may include both an active interconnector 210a and a backup interconnector 210b.

Figure 3:
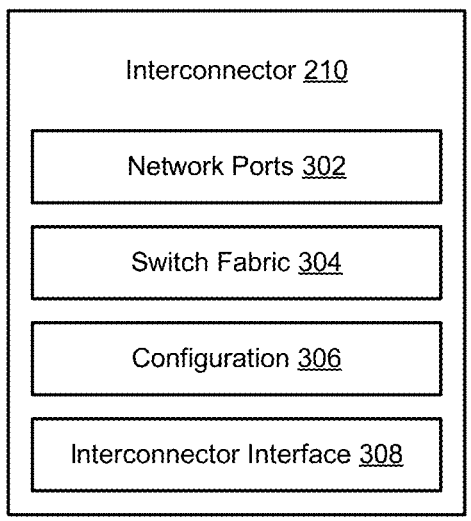
FIG. 3 shows detail of an interconnector according to embodiments of the disclosed technology.

FIG. 3 shows components of an interconnector 210 according to embodiments of the disclosed technology. The described components may be present in both the active interconnector 210a and the backup interconnector 210b. Referring to FIG. 3, the interconnector 210 includes a plurality of network ports 302 and a switch fabric 304 that interconnects the network ports 302 according to a configuration 306. The interconnector 210 also includes an interconnector interface 308 that allows the operation of the interconnector 210 to be controlled remotely. In particular, the interconnector interface 308 allows the configuration 306 to be observed and modified remotely. The interconnector interface 308 may execute within one of the servers 204 of the rack 202.

Figure 4:
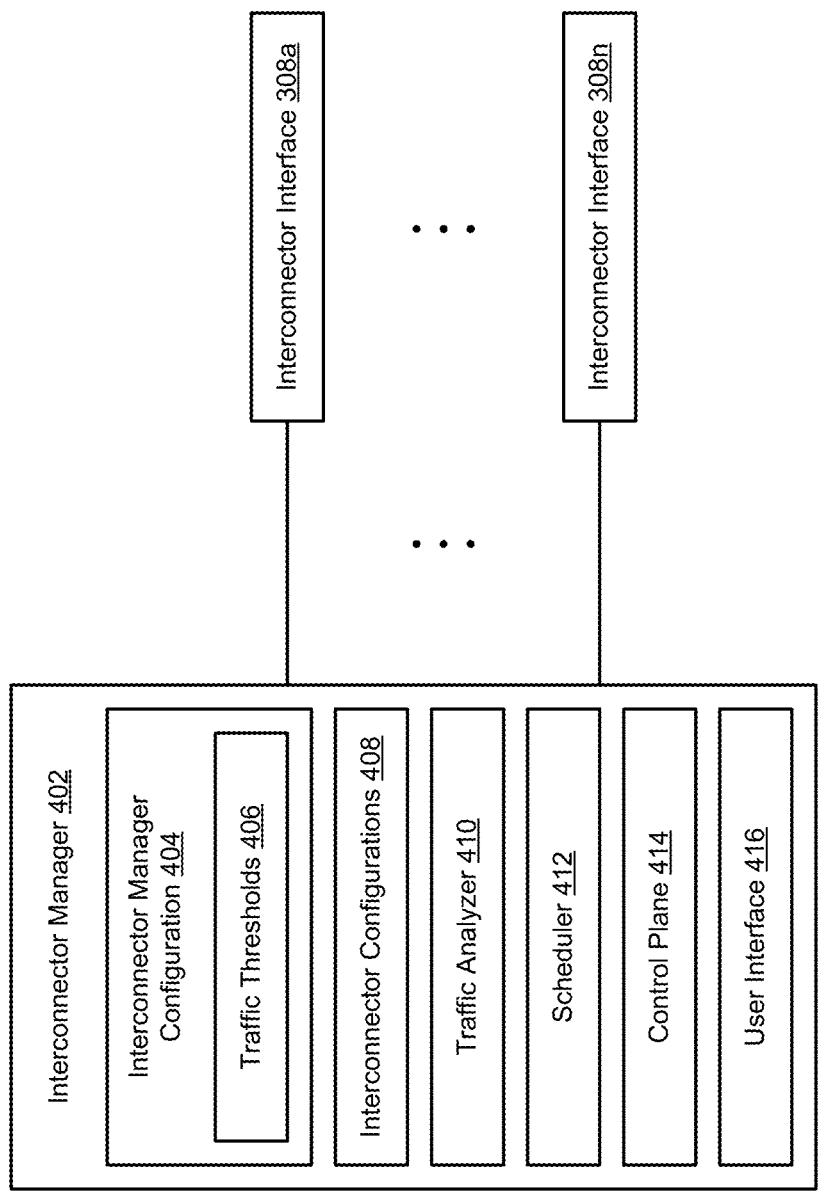
FIG. 4 illustrates a software architecture of the data center of FIGS. 2 and 3 according to embodiments of the disclosed technology.

FIG. 4 illustrates a software architecture of the data center of FIGS. 2 and 3 according to embodiments of the disclosed technology. Referring to FIG. 4, the software architecture provides an interconnector manager 402. The interconnector manager 402 may communicate with the interconnector interfaces 308a-n of the interconnectors 210 deployed in the racks 202 of the data center. For example, the interconnector manager 402 may communicate with the interconnector interfaces 308 over the network 208. The interconnector manager 402 may execute in one of the servers 204 in one of the racks 202 within the data center.

FIG. 4 illustrates a number of software components of the example interconnector manager 402. It should be understood that these software components are provided by way of example, and that the functions provided by the described software components may be provided through a different arrangement of software components.

Referring to FIG. 4, the example interconnector manager 402 stores a number of data. The data may include an interconnector manager configuration 404, according to which the interconnector manager 402 operates. The interconnector manager configuration 404 may include one or more traffic thresholds 406. The interconnector manager 402 may employ these traffic thresholds 406 to determine when load-balancing and scaling of the interconnectors 210 is required. For example, when network traffic on one interconnector 210 exceeds a corresponding maximum traffic threshold 406, the interconnector manager 402 may transfer traffic from that interconnector 210 to another interconnector 210.

The data may also include interconnector configurations 408, which include backup copies of the configurations of the interconnectors 210. The interconnector manager 402 may monitor the configurations 306 of the interconnectors 210. When a change is detected in the configuration 306 of an interconnector 210, the interconnector manager 402 may update its local copy 408 of the configuration of the interconnector 210 accordingly. And when traffic is to be migrated from one interconnector 210 to another, the interconnector manager 402 may use the locally-stored interconnector configurations 408 to select a destination interconnector 210 having a compatible configuration, or to modify the configuration 306 of a destination interconnector 210 to accommodate the traffic.

The interconnector manager 402 may include a traffic analyzer 410. The traffic analyzer 410 may monitor the network traffic loads of the interconnectors 210, for example to identify traffic overload conditions according to the traffic thresholds 406.

The interconnector manager 402 may include a scheduler 412. The scheduler 412 may control the operation of the interconnector manager 402 according to a schedule. For example, the traffic analyzer 410 may operate according to a schedule set by the scheduler 412.

The interconnector manager 402 may include a control plane 414. The control plane 414 may provide the interface between the interconnector manager 402 and the interconnector interfaces 308 of the interconnectors 210. In particular, the control plane 414 may establish a secure TCP/IP connection with the interconnector interface 308 of each interconnector 210. Using this connection, the interconnector manager 402 obtains information concerning each device in each rack 202. For example, the interconnector manager 402 may obtain the MAC addresses for those devices.

The interconnector manager 402 may include a user interface 416. The user interface 416 may take the form of a graphical user interface, and may be locally or remotely operated by the user. The user interface 416 allows a user to control the interconnector manager 402, as well as the interconnectors 210. For example, the user interface 416 may allow a user to observe and modify the configurations 408 of the interconnector manager 402, as well as the configurations 306 of the interconnectors 210. For example, the user interface 416 may allow a user to observe and modify the traffic thresholds 406.

Figure 5:
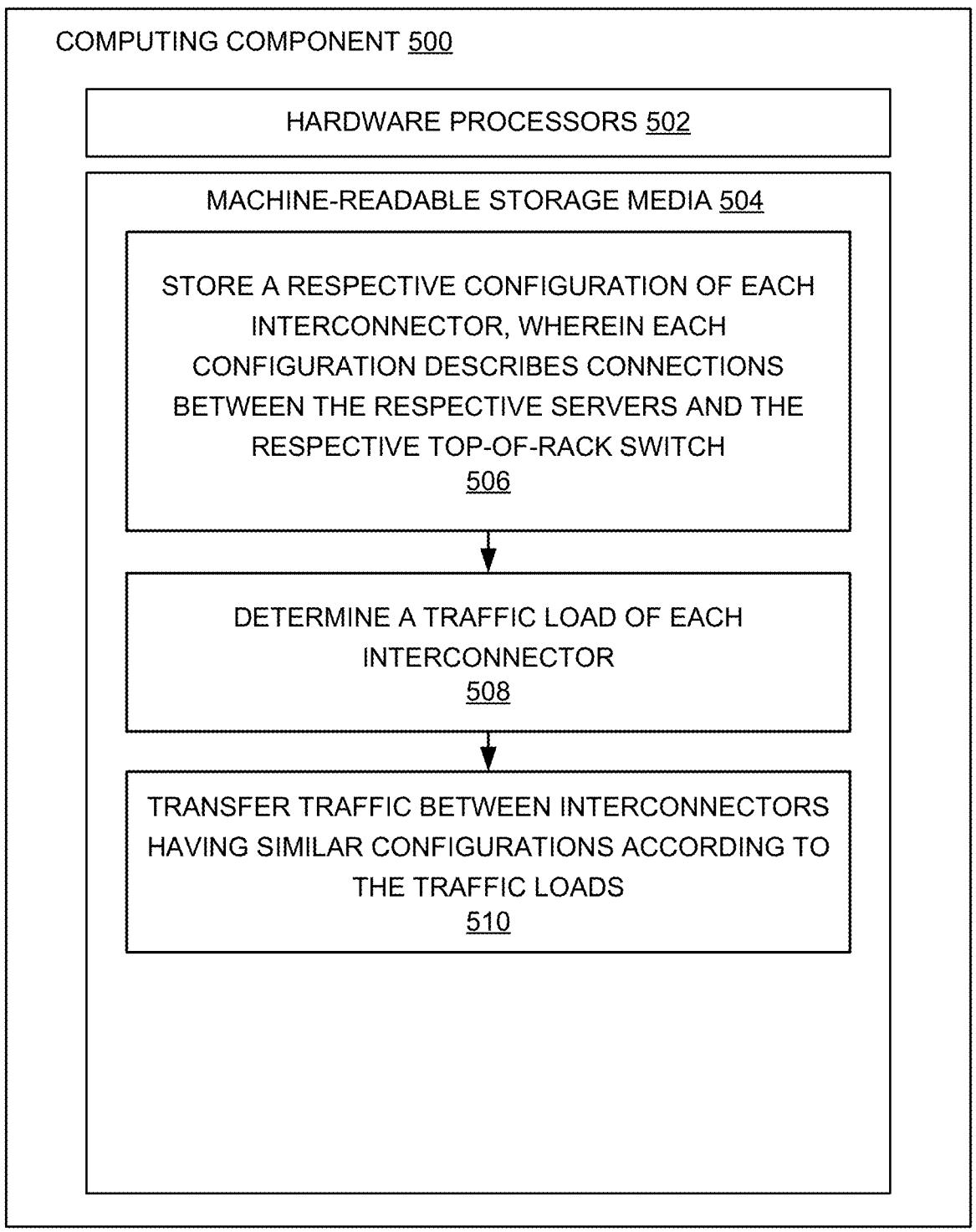
FIG. 5 is a block diagram of an example computing component or device for automatic network scaling in the data center in accordance with one embodiment.

FIG. 5 is a block diagram of an example computing component or device 500 for automatic network scaling in the data center in accordance with one embodiment. Computing component 500 may be, for example, a server computer, a controller, or any other similar computing component capable of processing data. In the example implementation of FIG. 5, the computing component 500 includes a hardware processor 502, and machine-readable storage medium 504. Computing component 500 may be an embodiment of interconnector manager 402, one or more of the interconnectors 210, one or more servers 204, or any combination thereof.

Hardware processor 502 may be one or more central processing units (CPUs), semiconductor-based microprocessors, and/or other hardware devices suitable for retrieval and execution of instructions stored in machine-readable storage medium, 504. Hardware processor 502 may fetch, decode, and execute instructions, such as instructions 506-510, to control processes or operations for automatic network scaling. As an alternative or in addition to retrieving and executing instructions, hardware processor 502 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 504, may be any electronic, magnetic, optical, or other physical storage device that contains or stores executable instructions. Thus, machine-readable storage medium 504 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 504 may be a non-transitory storage medium, where the term "non-transitory" does not encompass transitory propagating signals. As described in detail below, machine-readable storage medium 504 may be encoded with executable instructions, for example, instructions 506-510. Depending on the implementation, the instructions may include additional, fewer, or alternative instructions, and may be performed in various orders or in parallel.

Hardware processor 502 may execute instructions 506 to store a respective configuration of each interconnector. Each configuration describes connections between the respective servers and the respective top-of-rack switch. For example, referring to FIGS. 3 and 4, the interconnector manager 402 stores the configuration 306 of each interconnector 210 as part of the interconnector configurations 408. Referring to FIG. 2, a configuration 306 of an interconnector 210 in a rack 202 describes the network connections between the servers 204 in that rack 202 and the top-of-rack switch 206.

Hardware processor 502 may execute instructions 508 to determine a traffic load of each interconnector. For example, referring to FIG. 3, the traffic analyzer 410 of the interconnector manager 402 communicates with the interconnectors 210 using their interconnector interfaces 308 to determine a traffic load of each interconnector 210. This determination may be conducted at times specified by the scheduler 412 of the interconnector manager 402. The times may be configured by a user using the user interface 416 of the interconnector manager 402.

Hardware processor 502 may execute instructions 510 to transfer traffic between interconnectors having compatible configurations according to the traffic loads. For example, referring to FIG. 4, the control plane 414 of the interconnector manager 402 may transfer traffic between two interconnectors 210 via their interconnector interfaces 308. The traffic may be transferred between interconnectors 210 having compatible configurations 306. The interconnector configurations 306 may be observed in the interconnector configurations 408 stored in the interconnector manager 402. When no destination interconnector 210 having a compatible configuration 306 is available, the interconnector manager 402 may modify the configuration 306 of one of the interconnectors 210 to be compatible with that of the source interconnector 210 prior to transferring the traffic to that interconnector 210. For example, the interconnector manager 402 may apply the configuration 306 of the source interconnector 210 to the destination interconnector 210 prior to the transfer.

The traffic transfer may be triggered by the traffic load of the source interconnector 210 exceeding one of the traffic thresholds 406 stored in the interconnector manager configuration 404. For example, the interconnector manager 402 may initiate the traffic transfer responsive to determining that a traffic load of the source interconnector 210 exceeds a maximum traffic threshold 406 for that interconnector 210.

In some embodiments, the interconnector manager 402 may detect changes in interconnectors 210 through the use of a heartbeat mechanism. For example, each interconnector 210 may periodically send a heartbeat signal to the interconnector manager 402. The scheduler 412 of the interconnector manager 402 may monitor these heartbeat signals. When the heartbeat signals from one of the interconnectors 210 is not received, the interconnector manager 402 may determine that interconnector 210 has failed. Responsive to detecting this failure, the interconnector manager 402 may transfer the traffic of that interconnector 210 to the backup interconnector 210b, to interconnectors 210 on one or more other racks 202, or any combination thereof.

In some embodiments, the interconnector manager 402 may detect changes in the configuration 306 of an interconnector 210 through the use of a checksum mechanism. In such embodiments, a checksum is calculated for the configuration 306 of each interconnector 210. A change in the checksum for a configuration 306 indicates a change in the configuration 306. Responsive to detecting a change in a configuration 306 of an interconnector 210, the interconnector manager 402 obtains a copy of the new configuration 306 from that interconnector 210, and stores that configuration 306 in the locally-stored interconnector configurations 408.

In some embodiments, in addition to transferring current traffic for the purpose of load-balancing, the disclosed interconnector managers 402 may transfer traffic for other reasons. For example, when an active interconnector 210a experiences a failure, that failure may be detected by the interconnector manager 402 via the interconnector interface 308 for that active interconnector 210a. Responsive to detecting the failure, the interconnector manager 402 may transfer traffic from the failed active interconnector 210a to the backup interconnector 210b, which may then become the active interconnector. In general, a backup interconnector 210b for a rack 202 will have the same configuration 306 as the active interconnector 210a for that rack 202. But if for some reason the configurations 306 differ between the active interconnector 210a and the backup interconnector 210b, then the interconnector manager 402 may apply the configuration 306 of the active interconnector 210a to the backup interconnector 210b prior to the transfer.

In some embodiments, the interconnector manager 402 may modify the configuration 306 of an interconnector 210 of a rack 202 responsive to detecting a hardware modification in that rack 202. For example, a customer may add a new server 204 to the rack 202. The interconnector manager 402 may detect the addition of the new server 204. Responsive to detecting the presence of the new server 204, the interconnector manager 402 may modify the configuration 306 of the interconnector 210 in that rack 202 to accommodate the new server 204. In particular, the modification of the configuration 306 may control the network ports 302 and the switch fabric 304 of the interconnector 210 to provide connections between the new server 204 and the top-of-rack switch 206. For example, the interconnector manager 402 may modify the configuration 306 to provide connections for the new server 204 that are compatible with the connections of the servers 204 already present in the rack 202.

As another example, a customer may remove a server 204 from a rack 202. The interconnector manager 402 may detect the removal of the server 204 from the rack 202. Responsive to detecting the removal of the server 204, the interconnector manager 402 may modify the configuration 306 of the interconnector 210 in that rack 202 to accommodate the removal of the server 204. For example, the interconnector manager 402 may modify the configuration 306 of the interconnector 210 to allocate connections previously used by the removed server 204 to the other servers 204 present in the rack 202.

In some embodiments, the interconnector manager 402 may modify the configuration 306 of an interconnector 210 in a rack 202 responsive to detecting a change in traffic volume for one or more of the servers 204 in the rack 202. For example, responsive to detecting an increase in traffic volume for a server 204, the interconnector manager 402 may modify the configuration 306 of the respective interconnector 210 to increase the number of network ports 302 allocated to that server 204. Similarly, responsive to detecting a decrease in traffic volume for a server 204, the interconnector manager 402 may modify the configuration 306 of the respective interconnector 210 to decrease the number of network ports 302 allocated to that server 204. The interconnector manager 402 may then modify the configuration 306 of that interconnector 210 to allocate the unneeded network ports 302 to one or more of the other servers 204 in the rack 202.

In some embodiments, the interconnector manager may employ the configurations 306 of the interconnectors 210 to provide redundancy across multiple racks 202. In such embodiments, the interconnector manager 402 ensures the configurations 306 are compatible across the racks 202. Providing this redundancy ensures that the respective interconnectors 210 are ready for a rapid transfer of traffic across racks 202 when needed.

Embodiments of the disclosed technology provide numerous advantages. Users and customers of the data center are relieved of the tasks of configuring the racks 202 to accommodate hardware changes such as the addition or removal of servers 204. Accordingly the maintenance window of the data center is unaffected by these changes. Hardware failovers such as interconnector 210 failures are handled the automatically. And configurations 306 of interconnectors 210 are propagated automatically within the data center to accommodate these hardware changes. Furthermore, changes in demand are accommodated automatically by changing configurations 306 of the interconnectors 210 to allocate more or fewer interconnector ports 302 to one or more of the servers 204.

Figure 6:
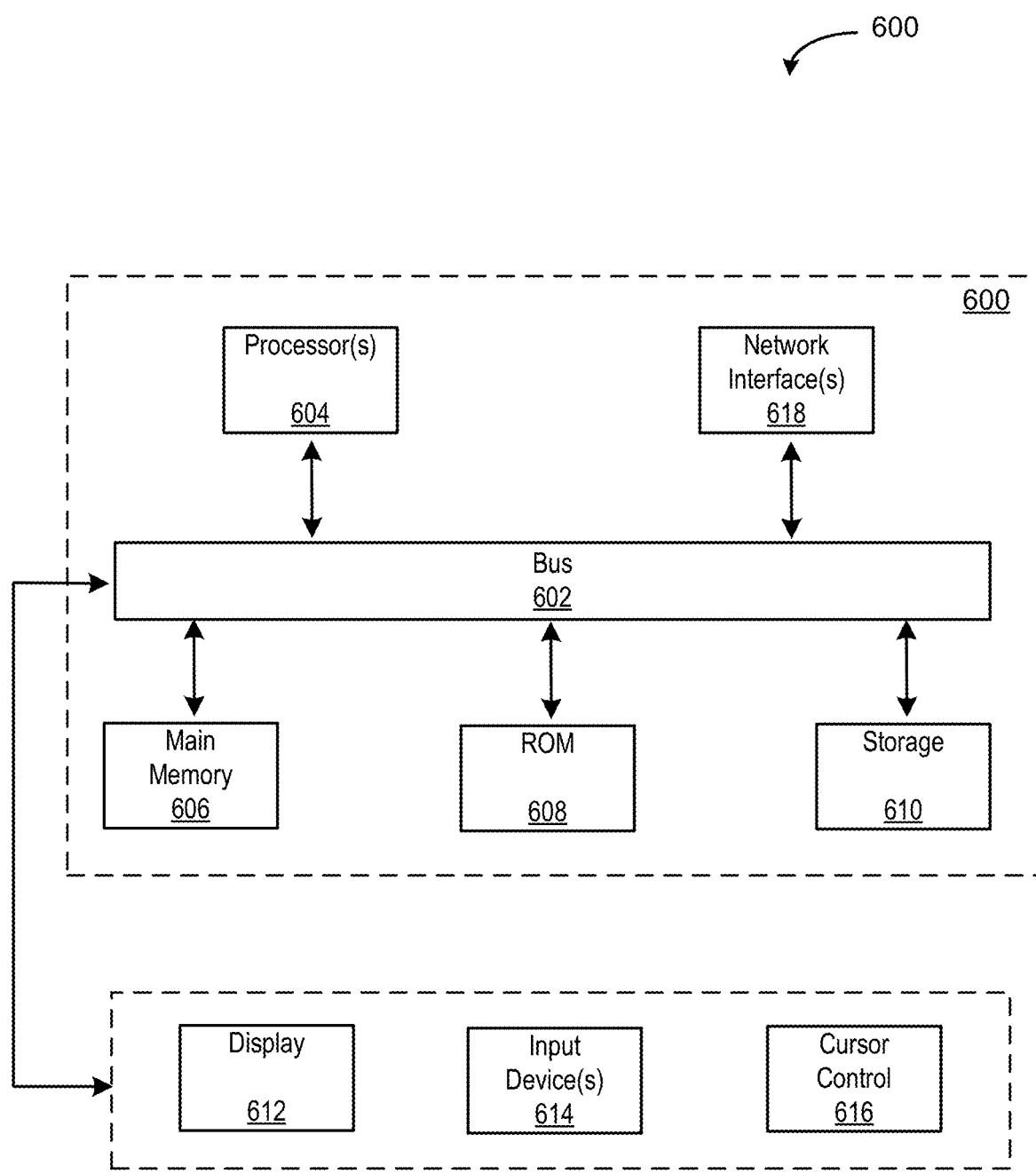
FIG. 6 is an example computing component that may be used to implement various features of embodiments described in the present disclosure.

FIG. 6 depicts a block diagram of an example computer system 600 in which embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a liquid crystal display (LCD) (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

The computer system 600 also includes a communication interface 618 coupled to bus 602. Network interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, network interface 618 may be a local area network (LAN) card to provide a data communication connection to a compatible LAN (or a WAN component to communicate with a WAN). Wireless links may also be implemented. In any such implementation, network interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, or a combination of hardware and software. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 600.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A system comprising:
   a plurality of racks, wherein each rack comprises:
      a plurality of servers,
      a top-of-rack switch in communication with a network, and
      an interconnector in communication with the servers and the top-of-rack switch;
   a hardware processor; and a non-transitory machine-readable storage medium encoded with instructions executable by the hardware processor to perform a method comprising:
storing a respective configuration of each interconnector, wherein each configuration describes connections between the respective servers and the respective top-of-rack switch,
determining a traffic load of each interconnector, and
transferring traffic between interconnectors having compatible configurations according to the traffic loads.

2. The system of claim 1, wherein the method further comprises:
determining a maximum traffic threshold; and
responsive to determining a traffic load of a first interconnector exceeds the maximum traffic threshold, transferring traffic from the first interconnector to a second interconnector.

3. The system of claim 2, wherein the method further comprises:
applying a configuration of the first interconnector to the second interconnector prior to transferring the traffic from the first interconnector to the second interconnector.

4. The system of claim 1, wherein the method further comprises:
detecting the addition of a new server to one of the racks; and
configuring the interconnector for the one of the racks to establish new connections between the new server and the top-of-rack switch for the one of the racks.

5. The system of claim 1, wherein the method further comprises:
detecting the removal of one of the servers from one of the racks; and
configuring the interconnector for the one of the racks to remove the connections between the removed one of the servers and the top-of-rack switch for the one of the racks.

6. The system of claim 1, wherein:
each of the racks comprises a backup interconnector; and
the method further comprises:
detecting a failure of one of the interconnectors, and
responsive to detecting the failure, transferring traffic from the failed one of the interconnectors to the respective backup interconnector.

7. The system of claim 1, wherein the method further comprises:
detecting a change in a traffic volume of one of the servers; and
responsive to detecting the change in the traffic volume, modifying the configuration of the respective interconnector to change a number of interconnector ports allocated to the one of the servers.

8. A non-transitory machine-readable storage medium encoded with instructions executable by the hardware processor to perform a method comprising:
storing respective configurations of a plurality of interconnectors, wherein each interconnector is in communication with a respective plurality of servers in a respective rack and a respective top-of-rack switch, and wherein each configuration describes connections between the respective servers and the respective top-of-rack switch,
determining a traffic load of each interconnector, and
transferring traffic between interconnectors having compatible configurations according to the traffic loads.

9. The medium of claim 8, wherein the method further comprises:
determining a maximum traffic threshold; and
responsive to determining a traffic load of a first interconnector exceeds the maximum traffic threshold, transferring traffic from the first interconnector to a second interconnector.

10. The medium of claim 9, wherein the method further comprises:
applying a configuration of the first interconnector to the second interconnector prior to transferring the traffic from the first interconnector to the second interconnector.

11. The medium of claim 8, wherein the method further comprises:
detecting the addition of a new server to one of the racks; and
configuring the interconnector for the one of the racks to establish new connections between the new server and the top-of-rack switch for the one of the racks.

12. The medium of claim 8, wherein the method further comprises:
detecting the removal of one of the servers from one of the racks; and
configuring the interconnector for the one of the racks to remove the connections between the removed one of the servers and the top-of-rack switch for the one of the racks.

13. The medium of claim 8, wherein each of the racks includes a backup interconnector; and wherein the method further comprises:
detecting a failure of one of the interconnectors, and
responsive to detecting the failure, transferring traffic from the failed one of the interconnectors to the respective backup interconnector.

14. The medium of claim 8, wherein the method further comprises:
detecting a change in a traffic volume of one of the servers; and
responsive to detecting the change in the traffic volume, modifying the configuration of the respective interconnector to change a number of interconnector ports allocated to the one of the servers.

15. A method comprising:
storing respective configurations of a plurality of interconnectors, wherein each interconnector is in communication with a respective plurality of servers in a respective rack and a respective top-of-rack switch, and wherein each configuration describes connections between the respective servers and the respective top-of-rack switch,
determining a traffic load of each interconnector, and
transferring traffic between interconnectors having compatible configurations according to the traffic loads.

16. The method of claim 15, wherein the method further comprises:
determining a maximum traffic threshold; and
responsive to determining a traffic load of a first interconnector exceeds the maximum traffic threshold, transferring traffic from the first interconnector to a second interconnector.

17. The method of claim 16, wherein the method further comprises:
applying a configuration of the first interconnector to the second interconnector prior to transferring the traffic from the first interconnector to the second interconnector.

18. The method of claim 15, wherein the method further comprises:
- detecting the addition of a new server to one of the racks; and
- configuring the interconnector for the one of the racks to establish new connections between the new server and the top-of-rack switch for the one of the racks.

19. The method of claim 15, wherein the method further comprises:
- detecting the removal of one of the servers from one of the racks; and
- configuring the interconnector for the one of the racks to remove the connections between the removed one of the servers and the top-of-rack switch for the one of the racks.

20. The method of claim 15, wherein each of the racks includes a backup interconnector; and wherein the method further comprises:
- detecting a failure of one of the interconnectors, and
- responsive to detecting the failure, transferring traffic from the failed one of the interconnectors to the respective backup interconnector.

21. The method of claim 15, wherein the method further comprises:
- detecting a change in a traffic volume of one of the servers; and
- responsive to detecting the change in the traffic volume, modifying the configuration of the respective interconnector to change a number of interconnector ports allocated to the one of the servers.

* * * * *